(12) United States Patent
Levin et al.

(10) Patent No.: US 9,607,821 B2
(45) Date of Patent: Mar. 28, 2017

(54) MODIFIED SPECTRUM INCANDESCENT LAMP

(75) Inventors: Robert E. Levin, Salem, MA (US); Ronald Blose, Emporium, PA (US); Richard Comtois, Windham, NH (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 13/476,452

(22) Filed: May 21, 2012

(65) Prior Publication Data

US 2013/0063016 A1 Mar. 14, 2013

Related U.S. Application Data

(60) Provisional application No. 61/534,343, filed on Sep. 13, 2011.

(51) Int. Cl.
| | |
|---|---|
| *H01K 1/32* | (2006.01) |
| *H01J 5/08* | (2006.01) |
| *H01J 61/40* | (2006.01) |
| *H01K 1/34* | (2006.01) |

(52) U.S. Cl.
CPC .............. *H01K 1/32* (2013.01); *H01J 5/08* (2013.01); *H01J 61/40* (2013.01); *H01K 1/34* (2013.01); *Y02B 20/125* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,029,983 | A * | 6/1977 | Thornton | H01J 61/44 313/25 |
| 4,256,988 | A * | 3/1981 | Coaton et al. | 313/579 |
| 4,574,218 | A * | 3/1986 | Bateman et al. | 313/635 |
| 4,673,840 | A * | 6/1987 | Gates | 313/25 |
| 4,743,803 | A * | 5/1988 | Lanese et al. | 313/579 |
| 5,627,426 | A | 5/1997 | Whitman et al. | |
| 5,744,900 | A * | 4/1998 | Labant | 313/112 |
| 6,238,348 | B1 * | 5/2001 | Crowley | A61B 5/00 600/476 |
| 8,461,754 | B2 | 6/2013 | Chowdhury et al. | |
| 2002/0153837 | A1 * | 10/2002 | Johnston et al. | 313/567 |
| 2003/0178940 | A1 * | 9/2003 | Yoshida et al. | 313/634 |
| 2004/0245912 | A1 * | 12/2004 | Thurk et al. | 313/484 |
| 2005/0212397 | A1 * | 9/2005 | Murazaki et al. | 313/487 |
| 2007/0075616 | A1 * | 4/2007 | Van Sprang | 313/110 |
| 2009/0102391 | A1 * | 4/2009 | Beers et al. | 315/182 |
| 2010/0194264 | A1 * | 8/2010 | Luennemann et al. | 313/489 |
| 2010/0327731 | A1 * | 12/2010 | Aurongzeb et al. | 313/316 |

(Continued)

OTHER PUBLICATIONS

GE Lighting, Spectrum Lamp Catalogue 2008/2009, Nov. 2008.

(Continued)

*Primary Examiner* — Anh Mai
*Assistant Examiner* — Fatima Farokhrooz
(74) *Attorney, Agent, or Firm* — Edward S. Podszus

(57) ABSTRACT

There is herein described a lamp having a light-transmissive envelope, a tungsten-halogen capsule and a coating disposed on the surface of the light-transmissive envelope or doped in the light-transmissive material. The light-transmissive envelope may comprise a light-transmissive material. The tungsten-halogen capsule can be positioned inside the light-transmissive envelope.

17 Claims, 4 Drawing Sheets

(56) References Cited

U.S. PATENT DOCUMENTS

2011/0031880 A1* 2/2011 Russell et al. ................ 313/643
2011/0148272 A1* 6/2011 Chowdhury et al. ......... 313/110
2014/0009692 A1* 1/2014 Sato .......................... F21K 9/00
                                                                348/760
2014/0321135 A1* 10/2014 Chen et al. ................... 362/487

OTHER PUBLICATIONS

Daniel Stern Lighting, Daniel J. Stern, Jul. 2009.
Technology and Application Tungsten Halogen Low Voltage Lamps Photo Optics, Osram Sylvania Inc., 2000.
Halogen goes green Energy efficient halogen solutions from GE, GE Lighting, Aug. 2009.
Lamps & Lighting Electronics Catalogue 2009, Philips Lighting, 2009.
Transparent Heat-mirror Materials and Deposition Technology, Carl M. Lampert and Stephen Selkowitz, SPIE Conference on Optical Coating for Energy Efficiency and Solar Applications, Los Angeles CA, Jan. 1982.
What's New? Lamps, Ballasts, LED, Andy Kyker, GE Lighting.

* cited by examiner

MODIFIED SPECTRUM INCANDESCENT LAMP

CROSS-REFERENCE TO RELATED APPLICATIONS

This application claims the benefit of and priority to U.S. Provisional Application Ser. No. 61/534,343, filed Sep. 13, 2011, entitled "MODIFIED SPECTRUM GENERAL SERVICE INCANDESCENT LAMP" the disclosures of which are hereby incorporated by reference in its entirety.

TECHNICAL FIELD

This invention relates to incandescent lamps. In particular, this invention relates to incandescent lamps containing tungsten-halogen capsules.

BACKGROUND

The Energy Independence & Security Act of 2007 (EISA) set minimum efficiency standards for many of the common incandescent lamps, and these standards go into effect during subsequent years. Many incandescent lamps, including the A-line incandescent lamps with medium screw bases that have become commonplace in residential and amenity areas, do not have sufficiently high luminous efficacies, defined as lumens per watt (LPW), to meet these new efficiency standards. Compact fluorescent lamps are one technical solution for providing replacement lamps with sufficient luminous efficacies. However, consumers do not desire the color of the compact fluorescent lamps. As a result, the lamps have not been greeted with enthusiasm in the marketplace.

Modified Spectrum General Service incandescent lamps, hereinafter referred to as "modified spectrum lamps," are a category of lamps defined by EISA. According to the definition, such modified spectrum lamps have desirable color properties for general lighting purposes but they are not sufficiently saturated in color to be classified in the defined category of Colored Lamps. EISA requires that the modified spectrum lamps not be more than about 25% below the LPW requirements for the category of General Service Incandescent Lamps.

EISA provides the lumen requirements for General Service Incandescent Lamps and Modified Spectrum Incandescent Lamps. For example, a 72 Watt General Service Incandescent Lamp needs to have 1490-2600 lumens. Accordingly, a 72 Watt Modified Spectrum Incandescent Lamp needs to have 1118-1950 lumens.

There are several commercially available A-line incandescent lamps in the Modified Spectrum class at the present, for example GE Reveal®, Philips Natural Light™, and Osram Sylvania Living Spaces™. These are conventional gas-filled incandescent lamps with either a tinted bulb glass or a tinted internal powder coating to cause slight deviations in the spectra of the light after it has been emitted directly from the filament. Chromaticity ranges of these lamps are shown in FIG. 1 on a 1931 CIE chromaticity diagram.

The GE Reveal lamps are based on the absorption of neodymium. Introduction of neodymium causes the color temperature (CT) of the filament-emitted light to increase with small neodymium concentrations. At sufficiently large neodymium concentrations, the CT decreases but the efficacy losses become unreasonable. The chromaticity is well below the blackbody locus meaning that the lamps have magenta tints.

Conversely, Osram Sylvania Living Spaces and Philips Natural Light lamps increase the CT of the filament-emitted light with reasonable increases of colorant concentration. The chromaticity remains closer to the blackbody locus meaning that the light does not take on the magenta tint associated with the neodymium lamps. A principle visual characteristic of the light from these lamps is that it tends to look somewhat less yellowish than the direct filament-emitted light. Such lamps tend to be more flattering to human complexion than compact fluorescent lamps. In addition, the lamps render a generally preferred appearance of objects with strong red reflective properties, i.e., where the spectral reflectance curve is high at wavelengths above about 620 nm.

These lamps have an undesirable feature that the color temperature is above the color temperature of comparable wattage of standard incandescent lamps. The color temperature range of standard incandescent lamps is usually considered to be the desirable range for residential and amenity applications. Lower color temperature may often be preferred. Furthermore, for residential and amenity applications the appearance of warmth is usually desirable where the lower color temperatures tend to be more flattering to human appearance. Other psychological factors, such as those used to evaluate quantitatively color preference for light sources, also are involved in explaining such desires and preferences.

DETAILED DESCRIPTION

For a better understanding of the present invention, together with other and further objects, advantages and capabilities thereof, reference is made to the following disclosure and appended claims taken in conjunction with the above-described drawings.

Figure 1:
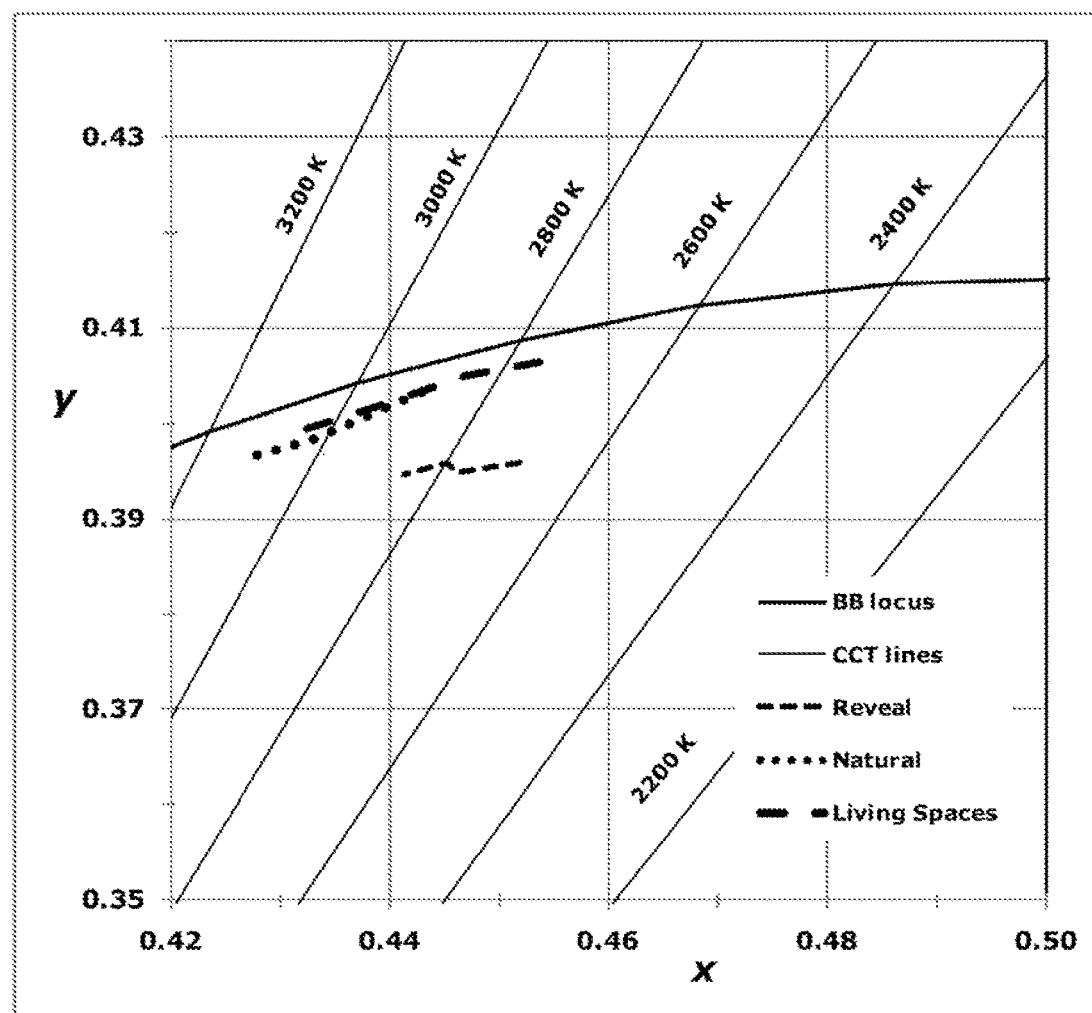
FIG. 1 shows the chromaticity ranges of prior art lamps on a 1931 CIE chromaticity diagram.
Figure 2:
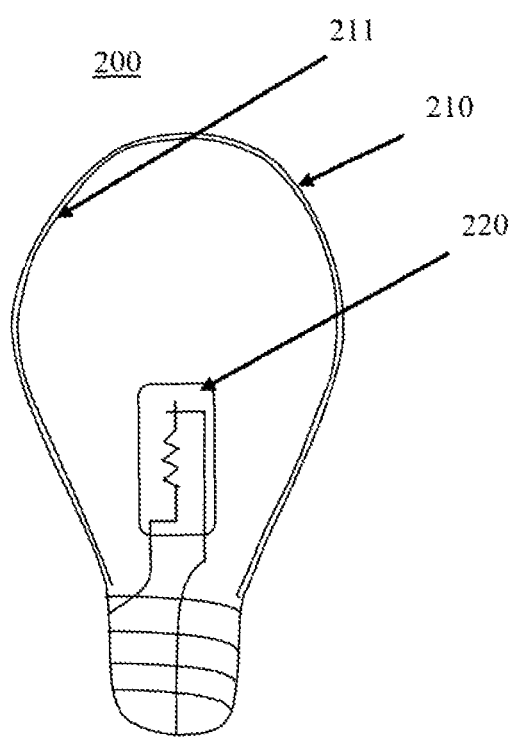
FIG. 2 is a schematic illustration of a lamp according to an embodiment of the present invention.
Figure 3:
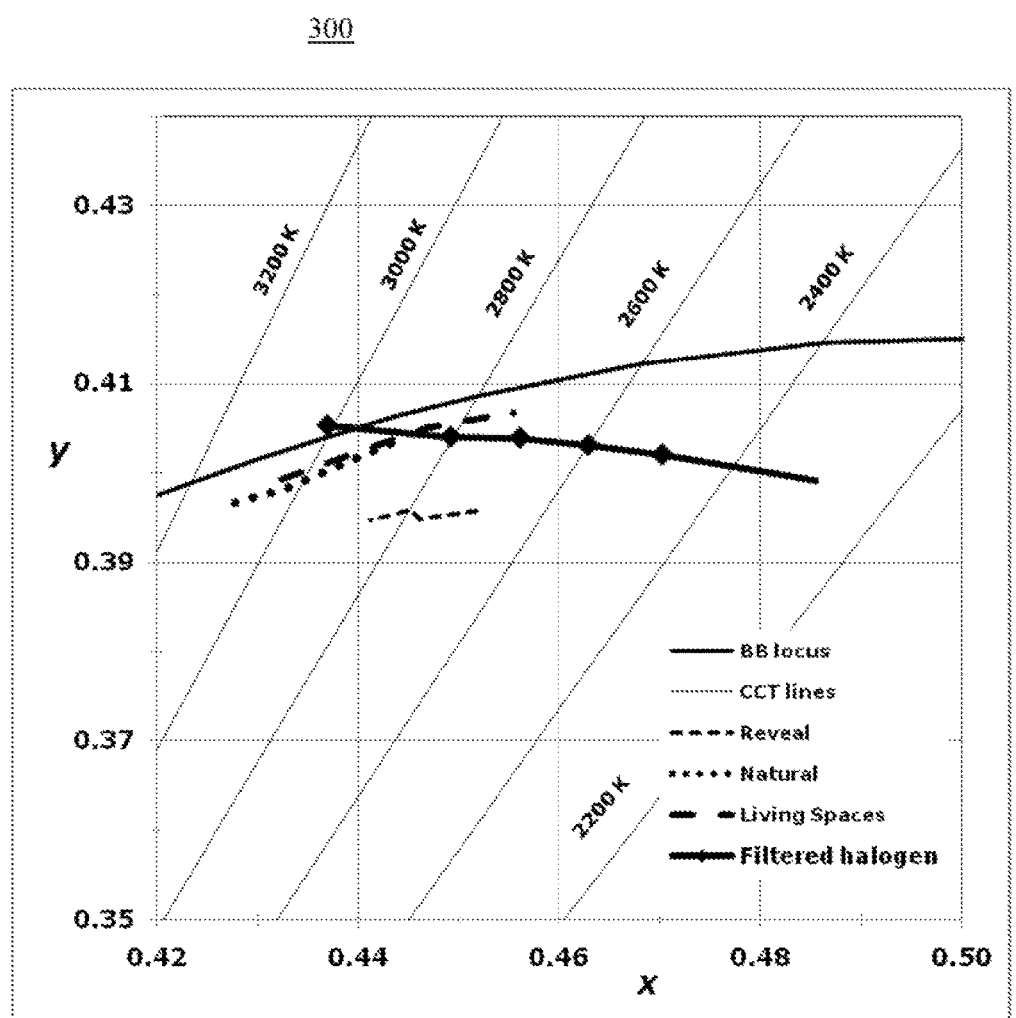
FIG. 3 shows the chromaticity range of a lamp according to an embodiment of the present invention on a 1931 CIE chromaticity diagram.

With reference to FIG. 2, a lamp 200, in accordance with a first embodiment of the invention is illustrated. The lamp 200 contains an outer envelope 210 and a tungsten-halogen capsule 220 inside of the outer envelope 210. The tungsten-halogen capsule 220 contains a tungsten filament within an inert gas and a small amount of a halogen gas such as iodine or bromine. The combination of the halogen gas and the tungsten filament produces a chemical reaction known as a halogen cycle that increases the lifetime of the filament and prevents darkening of the bulb by re-depositing tungsten. The tungsten-halogen capsule can operate at a higher filament temperature than a standard gas-filled lamp. The higher operating temperature results in a filament-emitted light of a higher color temperature and higher luminous efficacy.

A coating 211 is applied to the outer envelope 210. The coating 211 is a diluted powder coating. The chemical composition of the powder is a base of, for example, precipitated silica and a composition of colorants. The volume of colorants may be between 5%-25% of the coating composition. The coating 211 can be applied at a thickness/density similar or equal to that of the soft white finish on currently available Osram Sylvania® lamps. The coating 211 is spectrally selective and partially absorptive. The coating 211 can be chosen to reduce the color temperature without a large loss of lumens and to move the chromaticity of the light to a point below the blackbody locus and at least four MacAdam steps from that of the filament-emitted light. Thus, the lamp 200 may have a chromaticity that conforms to the definition of a modified spectrum lamp under EISA. Table 1 provides exemplary compositions of the coating for a range of colorant percentages.

TABLE 1

| Hi-Sil T-700 PRECIPITATED SILICA | 67.5 | 66.75 | 66 | 64.2 | 62.4 |
|---|---|---|---|---|---|
| BURGESS 50 ALUMINUM SILICATE PIGMENT | 30.5 | 30 | 29.5 | 28.5 | 27.5 |
| C-896-2 CrSn PINK | 0.35 | 1.4 | 2.44 | 4.7 | 7.05 |
| RED IRON OXIDE R-2199 | 0.05 | 0.2 | 0.36 | 0.7 | 1.05 |
| COUPLING AGENT | 1.6 | 1.68 | 1.75 | 1.9 | 2 |

The lamp 200 can have a power rating of 72 watts. However, embodiments are not limited to this power rating and can constructed to provide a power rating in a range of about 28-72 watts. The resulting color temperature of the lamp 200 can be 2800K. The lamp 200 can produce 1360 lumens at an efficacy of about 19 LPW. The resulting color rendering index of the lamp can be about 99. Other embodiments can be provided with a lumen in range from about 232 to about 1950. Embodiments can also be designed to have a life of 1000-5000 hours.

Increasing the concentration of colorant in the coating may allow for a reduction in the density and/or thickness of the coating. For example, a 10% colorant composition coating may have a thickness/density similar or equal to that of the current soft white finish. A 25% colorant composition may also be used with a thickness/density slightly less than that of the current soft white finish.

The color temperatures, lumens, and CRIs of lamps according to embodiments with varied coating densities and/or concentrations are shown in Table 2.

TABLE 2

|   | ~CT (K) | ~lumens | ~CRI (Ra) |
|---|---|---|---|
| 1 | 3010 | 1490 | 100 |
| 2 | 2800 | 1360 | 99 |
| 3 | 2700 | 1290 | 98 |
| 4 | 2600 | 1220 | 98 |
| 5 | 2500 | 1140 | 97 |

Successively denser coatings produce lamps at 2800K, 2700K, 2600K, and 2500K. The range from 2500K to 2800K represents lamps that meet the efficacy requirements of a modified spectrum lamp. These lamps meet the need for lower color temperature appropriate for residential and amenity general lighting applications while satisfying the standards for modified spectrum lamps.

In another embodiment, a thin, substantially non-absorbing, diffuse coating may be placed between a colorant layer and the bulb glass. The diffuse coating may eliminate the colored appearance caused by colorant, in case a white-appearing bulb is desired.

Design of the lamp system can be done through the measurement of an effective spectral transmittance, $\tau(\lambda)_{eff}$, of the coating or bulb wall transmittance. This is a function of wavelength and is affected by the spectral power distribution of the filament-emitted light at each wavelength in the visible spectrum. An effective spectral transmittance is also affected by both the direct transmission through the coating and the multiple internal reflections of light from a spectrally selective surface. Quantities such as color temperature, chromaticity, and luminous flux of the light from the lamp can be calculated based on the effective spectral transmittance.

Figure 4:
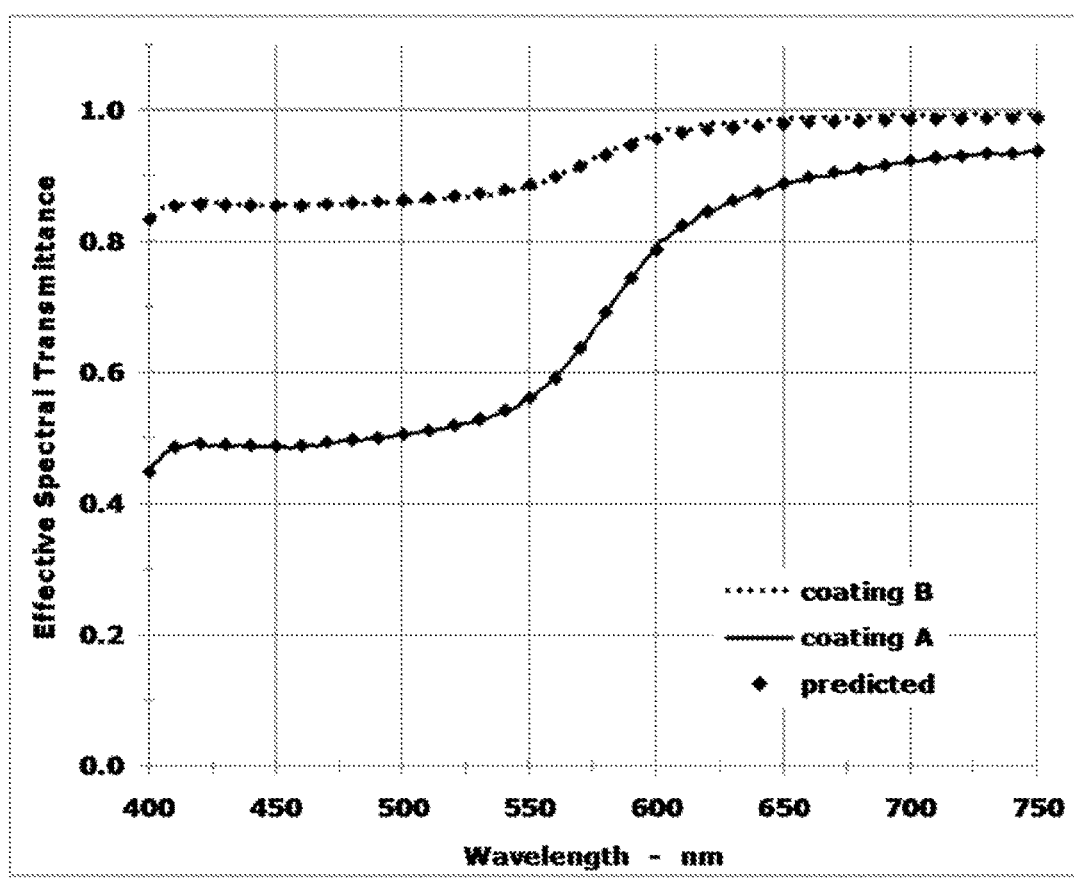
FIG. 4 shows the effective spectral transmittances of a lamp having different coating concentrations.

For cases where attenuations are kept low to maintain high luminous efficacies, a semi-empirical equation based on classic radiative transfer technique for multiple reflections can be used:

$$\tau(\lambda)_{eff} = 1/[1+g(\lambda)k] \quad (1);$$

where function $g(\lambda)$ is a measure of the spectral effect, and k is a measure of colorant concentration or coating thickness. Function $\tau(\lambda)_{eff}$ is measured from the spectral emission of a lamp prepared with a coating material A having concentration of k. Function $g(\lambda)$ can be calculated using the equation (1). Since function $g(\lambda)$ is known for the lamp, effective spectral transmittance of the lamp with the coating material A having a lower concentration can be predicted. FIG. 4 shows both the predicted and measured effective spectral transmittances of the same lamp with the coating material A having a lower concentration. The calculated result matches the experimental measurement.

While the principles of the invention have been described herein, it is to be understood by those skilled in the art that this description is made only by way of example and not as a limitation as to the scope of the invention. Reference numerals corresponding to the embodiments described herein may be provided in the following claims as a means of convenient reference to the examples of the claimed subject matter shown in the drawings. It is to be understood, however, that the reference numerals are not intended to limit the scope of the claims. Other embodiments are contemplated within the scope of the present invention in addition to the exemplary embodiments shown and described herein. Modifications and substitutions by one of ordinary skill in the art are considered to be within the scope of the present invention, which is not to be limited except by the recitations of the following claims.

What is claimed is:

1. A lamp having a rated wattage, the lamp comprising:
   a light-transmissive envelope comprising a light-transmissive material;
   a tungsten-halogen capsule housing a tungsten filament, wherein said tungsten-halogen capsule is housed inside the light-transmissive envelope; and
   a coating being disposed on a surface of the light-transmissive envelope or doped in the light-transmissive material, a concentration of the coating being arranged so that the lamp has a color rendering index of at least 50, the lamp has a correlated color temperature from 2400K to 2800K, and the lamp has a lumen per watt of at least 75% of a general service incandescent lamp having the rated wattage's lumen per watt wherein the coating decreases the correlated color temperature of the lamp and wherein the coating comprising about 67.5-66% precipitated silica, 30.5-29.5% aluminum silicate pigment, 0.35-2.44% CrSn pink, 0.05-0.36% red iron oxide, and 1.6-1.75% coupling agents.

2. The lamp of claim 1, wherein the tungsten-halogen capsule comprises:
   an inert gas and
   a halogen gas.

3. The lamp of claim 1, wherein the rated wattage is 72 watts.

4. The lamp of claim 1, wherein the rated wattage is 42 watts.

5. The lamp of claim 1, wherein the lamp has the color rendering index between 97-100.

6. The lamp of claim 1, wherein the lamp produces between 1100-1500 lumens.

7. The lamp of claim 1, wherein the coating colorant comprising aluminum silicate pigment, titanium dioxide, CrSn pink, and red iron oxide.

8. The lamp of claim 1, wherein the coating comprising precipitated silica, aluminum silicate pigment, titanium dioxide, CrSn pink, red iron oxide, and coupling agents.

9. The lamp of claim 1, wherein the coating comprising about 66.75% precipitated silica, 30% aluminum silicate pigment, 1.4% CrSn pink, 0.2% red iron oxide, and 1.68% coupling agents.

10. The lamp of claim 1, wherein the concentration of the coating is arranged so that the lamp has a correlated color temperature at 2800K.

11. The lamp of claim 2, wherein the halogen gas is an iodine or a bromine.

12. A lamp having a rated wattage, the lamp comprising:
   a light-transmissive envelope comprising a light-transmissive material;
   a tungsten-halogen capsule having within said tungsten-halogen capsule a filament adapted to emit light wherein said tungsten-halogen capsule is housed inside the light-transmissive envelope; and
   a coating being disposed on a surface of the light-transmissive envelope or doped in the light-transmissive material, a concentration of the coating being arranged so that the lamp has a color rendering index of at least 50, reduces a correlated color temperature of light emitted from the tungsten-halogen capsule to between 2400K and 2800K, the lamp has a color point with (x,y) chromaticity coordinates on a CIE 1931 chromaticity diagram that lies below a black-body locus, and the color point with (x,y) chromaticity coordinates on the CIE 1931 chromaticity diagram lies at least 4 MacAdam steps distant from a color point of the filament-emitted light and wherein the coating comprising about 675-66% precipitated silica, 30.5-29.5% aluminum silicate pigment, 0.35-244% CrSn pink, 0.05-0.36% red iron oxide, and 1.6-1.75% coupling agents.

13. The lamp of claim 12, wherein the coating colorant comprising aluminum silicate pigment, CrSn pink, and red iron oxide.

14. The lamp of claim 12, wherein the coating comprising about 66.75% precipitated silica, 30% aluminum silicate pigment, 1.4% CrSn pink, 0.2% red iron oxide, and 1.68% coupling agents.

15. The lamp of claim 12, wherein the concentration of the coating is arranged so that the lamp has a correlated color temperature at 2800K and the lamp has a lumen per watt of at least 75% of a general service incandescent lamp having the rated wattage's lumen per watt.

16. A lamp having a rated wattage, the lamp comprising:
   a light-transmissive envelope comprising a light-transmissive material;
   a tungsten-halogen capsule housing a tungsten filament, wherein said tungsten-halogen capsule is inside the light-transmissive envelope; and
   a coating being disposed on a surface of the light-transmissive envelope or doped in the light-transmissive material, the coating being arranged to increase a y coordinate of a color point of the lamp to greater than 0.40 for (x,y) chromaticity coordinates on a CIE 1931 chromaticity diagram and the lamp has a lumen per watt of at least 75% of a general service incandescent lamp having the rated wattage's lumen per watt and wherein a concentration of the coating colorant between 15% and 20% wherein the coating comprising about 675-66% precipitated silica, 30.5-29.5% aluminum silicate pigment, 0.35-2.44% CrSn pink, 0.05-0.36% red iron oxide, and 1.6-1.75% coupling agents.

17. The lamp of claim 16, wherein the lamp has a correlated color temperature from 2400K to 2800K.

* * * * *